March 28, 1939.  B. McINNERNEY  2,152,074
HYDRAULIC FOUR-WHEEL BRAKE
Filed April 4, 1938
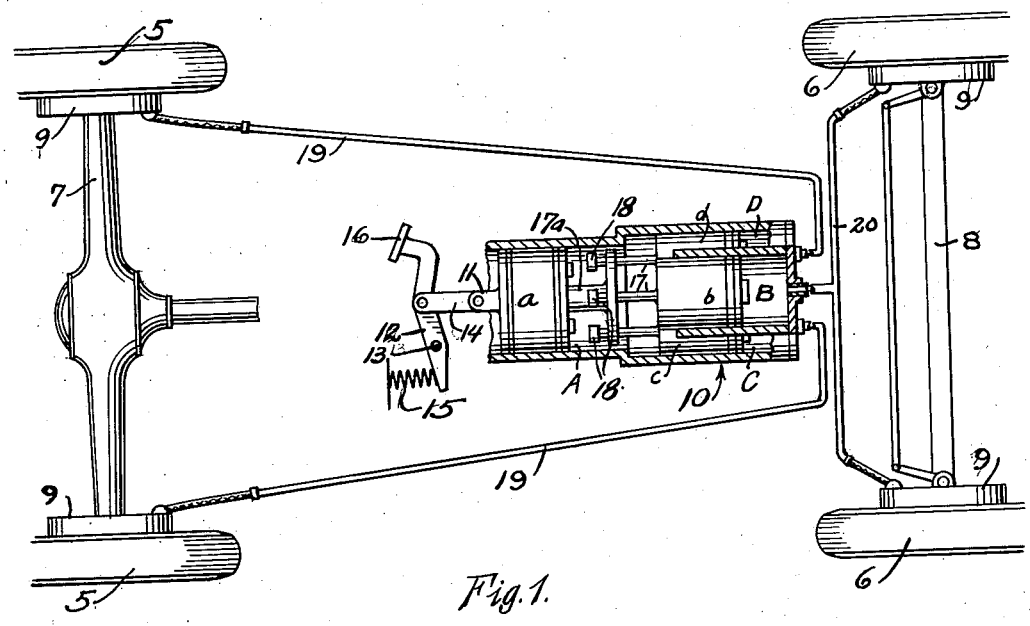
Fig.1.
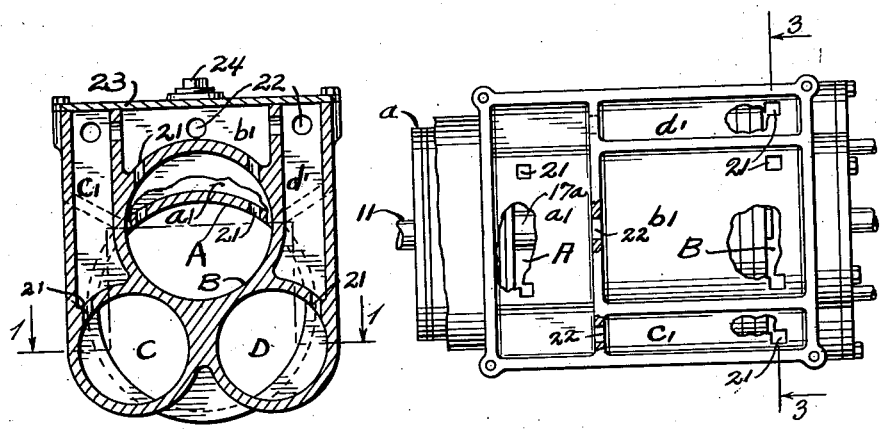
Fig.2.
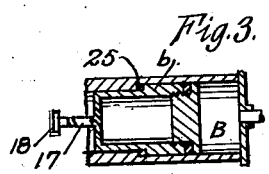
Fig.3.
Fig.4.
Inventor
Benjamin McInnerney.
By Martin E. Anderson
Attorney Patented Mar. 28, 1939

2,152,074

UNITED STATES PATENT OFFICE 2,152,074

HYDRAULIC FOUR-WHEEL BRAKE

Benjamin McInnerney, Omaha, Nebr.

Application April 4, 1938, Serial No. 199,834

4 Claims. (Cl. 188—152)

This invention relates to improvements in brakes for automobiles.

The present high speed automobiles are all provided with brakes on all four wheels as this is found to be an essential to safety.

The equalizing of four brakes has been found to be a difficult task and in practically all automobiles where the distance between the front and the rear axles is not fixed the brakes are operated by hydraulic means.

In order to assure that at least some of the brakes will remain operative if a break occurs in a conduit conducting liquid to one or more of the brakes, many ingenious devices have been invented. Among such devices are systems employing a separate cylinder and plunger for each brake; the idea being that any one break will affect only a single brake.

The use of brakes on the front wheels is a development that is due to the use of high speed automobiles and entails certain difficulties that are peculiar to a front wheel braking system.

It has been found that the brakes on the front wheels must be applied with less force than those on the rear wheels because if the reverse is tried there is great danger of the automobile turning around or somersaulting. As an extreme example we can consider an automobile having front wheel brakes but no rear wheel brakes. The danger from such an arrangement is obvious.

It is also quite essential that the brakes shall be applied as equally as possible on the two front wheels because an unequal application tends to make the automobile turn to the side having the greatest braking action. As an extreme example of unequal braking of the front wheels we may consider a case in which the brake functions normally on one front wheel while it is entirely inoperative on the other.

With respect to the rear wheels, it is not so essential that the brakes be equally effective on both wheels, although that is, of course, desirable.

If we consider an ordinary hydraulic braking system having a single plunger and cylinder for putting the liquid under pressure, and all of the brakes connected to this cylinder by suitable conduits, it becomes evident that if one conduit breaks all of the four brakes will become inoperative.

If we consider the other extreme case in which each brake is operated from a separate cylinder and plunger assembly, we find that a break in any one conduit affects only the brake in that conduit. With the latter system, if the conduit through which liquid pressure is transmitted to the brake on one of the front wheels springs a leak, the brake on that wheel becomes inoperative while the other remains operative and this produces a highly dangerous condition. If the break occurs in a conduit connected with a rear brake, the same unequality results, but with less prospect for dangerous consequences.

It is apparent from the above that it is much safer to have both front wheel brakes become inoperative at the same time so that the braking effect will be equal at all times.

It is the object of the present invention to produce a four wheel brake system in which equal brake action is in force at all times on the front wheels, so that, if a break or a leak occurs in the conduit to one front wheel brake, it will affect both brakes equally.

In order to describe the invention so that it can be understood readily, reference will now be had to the accompanying drawing in which one embodiment of the invention has been illustrated and in which:

Figure 1 is a top plan view showing the front and rear axles and wheels of an automobile, in a diagrammatic manner, and in which a hydraulic pressure producing assembly is shown in section, taken on line 1—1 Fig. 2;

Figure 2 is a top plan view, with the top removed, portions being broken away to better disclose the construction;

Figure 3 is a section taken on line 3—3 Fig. 2; and

Figure 4 shows a slight modification.

In the drawing reference numerals 5 designate the rear wheels and numerals 6 the front wheels of an automobile. The pairs of wheels are connected respectively to the ends of the rear axle 7 and the front axle 8 in the usual way. Each wheel is provided with a brake mechanism 9, which, in the example shown, is of the hydraulic type. No effort has been made to illustrate the construction of the brake mechanisms 9 because any of the types in common use can be employed. Brake mechanisms of the type employed with hydraulic brakes are, of course, so constructed that they are operated by a liquid that is subjected to pressure by some suitable means.

This invention relates to a combination of which the means for placing the liquid under pressure forms one element and this will now be described.

Supported by the chassis frame is a cylinder block 10 having four cylinders which have been designated by reference characters A, B, C and D. Cylinder A has a larger diameter than any of the others. Cylinder B has been shown as of a smaller diameter than A and of a larger diameter than C and D. In the actual embodiment the cross sectional area of cylinder B is substantially equal to the combined areas of cylinders C and D (the latter are of equal diameters).

A piston $a$ is positioned in cylinder A and has a piston rod 11 that is connected with a pedal 12, pivoted at 13, by means of a link 14. A spring 15 exerts a force tending to move the pedal 12 counter clock-wise and is strong enough to return the piston $a$ after it has been moved inwardly by pressure applied at 16.

Each of the cylinders B, C and D are provided with pistons $b$, $c$ and $d$ having headed rods 17 projecting from their inner ends. Piston $a$ has a central rod 17a carrying at its outer end a plate having openings through which rods 17 extend. Each rod 17 has a head 18 that is positioned inside of the plate and which is larger than the openings in the plate. The rods 17 and heads 18 serve to retract the pistons $a$, $b$ and $c$.

Cylinders C and D are each connected with a rear wheel brake mechanism by means of a conduit 19.

Cylinder B is connected with both front wheel brakes by means of a conduit 20.

Referring now more particularly to Figs. 2 and 3, it will be seen that the engine block is provided, above the cylinders, with compartments $a1$, $b1$, $c1$ and $d1$. Each compartment is in communication with its corresponding cylinder through an opening 21; these openings are so positioned that they are uncovered when the pistons are in retracted positions and are covered by the first forward movement of the pistons. The several compartments are in communication through openings 22. The tops of the compartments are closed by a removable cover 23 that has an opening closed by a screw plug 24 through which oil can be supplied to the compartments.

Let us now assume that the system is filled with a suitable brake liquid, such as a thin oil, and that sufficient pressure is applied to the pedal 16 to move piston $a$ forwardly. As soon as this piston covers opening 21 the liquid will be put under pressure and further movement will produce an outward movement of pistons $b$, $c$ and $d$. As soon as these cover openings 21 the liquid in front of the pistons will be put under pressure, thereby applying the brakes to the wheels. When the operating force is removed from pedal 16 the spring 15 returns piston $a$ and thus removes the pressure from the brakes, thereby releasing them. Heads 18 serve to retract pistons $b$, $c$ and $d$ and, if there has been any loss of liquid, due to leaks or breakage, this will be replaced as soon as openings 21 are uncovered.

It is apparent that, since each rear wheel brake is connected to a separate cylinder, a break in either conduit 19 will render only one brake inoperative. If a leak or break occurs in conduit 20, however, both front wheel brakes will be affected equally. By making the cylinder B of such size that its cross sectional area is about the same as the combined areas of cylinders C and D the travel of the three pistons will be about the same because cylinder B operates two brake mechanisms while cylinders C and D each supply a single brake mechanism.

Since it is desirable to apply a somewhat less braking action on the front wheels than on the rear wheels, the brake mechanisms on the front wheels should be so designed that the braking action per unit liquid pressure is less than on the rear brakes. This effect can be obtained by using identical brake mechanisms on all four wheels, but making piston $b$ of two different diameters, as indicated in Fig. 4, in which case the space 25 should be in communication with a compartment corresponding to $b1$ through a suitable opening like opening 21 in Fig. 3, which is not visible in Fig. 4 because the upper side of the cylinder has been removed. The preferable way is to employ slightly different brake mechanisms on the front and the rear wheels. The use of a compression spring to resist the forward movement of piston $b$ will also serve to reduce the braking action on the front wheels.

I have illustrated and described one embodiment of the invention that proportions the braking force between the several brakes and in which positive means is provided for retracting pistons $b$, $c$ and $d$. Although similar results may be obtained by slightly different mechanisms, I believe the specific embodiment illustrated in Fig. 1 has features of construction that are desirable.

Having described the invention what is claimed as new is:

1. A pressure distributing and proportioning device for the simultaneous operation of a plurality of hydraulic brakes, comprising in combination a cylinder block having a plurality of cylindrical openings, a piston mounted for reciprocation in each opening, means comprising a piston reciprocably mounted in one of the cylinders for producing a hydraulic pressure against corresponding ends of the other pistons, each of the first mentioned pistons having headed rods extending towards the last mentioned piston, the latter having a plate attached to its front end and provided with openings through which the rods pass, the heads being larger than the openings, whereby the several pistons can be simultaneously retracted.

2. In an automobile having a pair of front wheels and a pair of rear wheels, each provided with a brake, a pressure producing and distributing device comprising in combination, a cylinder block having three cylindrical openings, a piston mounted for reciprocation in each opening, the three pistons being independently and relatively movable hydraulic means for simultaneously applying to all of the pistons forces acting to move them in a forward direction to expel a liquid from the cylindrical openings under balanced predetermined pressures, means independent of the expelled liquid for retracting the pistons when the applying force is released, a separate liquid supply reservoir for each cylinder, each reservoir communicating with its cylinder through an opening positioned directly in front of the forward face of its piston when it is in retracted position, a conduit connecting the forward end of one cylinder with one rear wheel brake, a second conduit connecting the second cylinder with the opposite rear wheel brake, and a branched conduit connecting the third cylinder with the two front wheel brakes, whereby any change in pressure will affect both front wheel brakes equally.

3. In an automobile having a pair of front wheels and a pair of rear wheels, each provided with a brake, a pressure producing and distributing device comprising in combination, a cylinder block having three cylindrical openings, a piston mounted for reciprocation in each opening, the three pistons being independently and relatively movable, hydraulic means for simultaneously applying to all of the pistons forces acting to move them in a forward direction to expel a liquid from the cylindrical openings under balanced predetermined pressures, means independent of the expelled liquid for retracting the pistons when the applying force is removed, a conduit connecting the forward end of one cylinder with one rear wheel brake, a second conduit connecting the second cylinder with the opposite rear wheel brake, and a branched conduit connecting the third cylinder with the two front wheel brakes, whereby any change in pressure will affect both front wheel brakes equally.

4. In an automobile having a pair of front wheels and a pair of rear wheels, each provided with a brake, a pressure producing and distributing device comprising in combination, a cylinder block having three cylindrical openings, a piston mounted for reciprocation in each opening, the three pistons being independently and relatively movable, hydraulic means for simultaneously applying to all of the pistons forces acting to move them in a forward direction to expel a liquid from the cylindrical openings under balanced predetermined pressures, means independent of the expelled liquid for retracting the pistons when the applying force is removed, means for supplying to each cylinder liquid to replace that lost by leakage, a conduit connecting the forward end of one cylinder with one rear wheel brake, a second conduit connecting the second cylinder with the opposite rear wheel brake, and a branched conduit connecting the third cylinder with the two front wheel brakes, whereby any change in pressure will affect both front wheel brakes equally.

BENJAMIN McINNERNEY.